US006665081B1

United States Patent
Suzuki et al.

(10) Patent No.: US 6,665,081 B1
(45) Date of Patent: Dec. 16, 2003

(54) PRINT SYSTEM PRINTER DRIVER AND PRINTER

(75) Inventors: Tetsuya Suzuki, Nagano (JP); Sunao Murata, Hokkaido (JP); Takeshi Miyashita, Nagano (JP); Shinji Nozawa, Nagano (JP); Kouji Tanaka, Nagano (JP); Shinji Sumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/167,734

(22) Filed: Oct. 7, 1998

Related U.S. Application Data

(63) Continuation-in-part of application No. 08/896,947, filed on Jul. 18, 1997, now abandoned.

(30) Foreign Application Priority Data

Jul. 19, 1996 (JP) .............................................. 8-190849
Oct. 17, 1997 (JP) .............................................. 9-284943

(51) Int. Cl.$^7$ .............................................. G06F 15/00
(52) U.S. Cl. ..................... 358/1.13; 358/1.14; 358/1.15
(58) Field of Search ................................ 358/1.5, 1.12, 358/1.13, 1.14, 1.15, 1.16, 1.17, 1.18, 407, 468, 438, 1.11

(56) References Cited

U.S. PATENT DOCUMENTS

| | | | |
|---|---|---|---|
| 4,254,467 A | | 3/1981 | Davis et al. |
| 5,471,563 A | | 11/1995 | Dennis et al. |
| 5,577,173 A | | 11/1996 | Dennis et al. |
| 5,680,521 A | * | 10/1997 | Pardo et al. ................. 358/1.13 |
| 5,859,956 A | * | 1/1999 | Sugiyama et al. .......... 358/1.13 |
| 5,931,586 A | * | 8/1999 | Kashiwazaki et al. ......... 400/61 |
| 5,960,166 A | * | 9/1999 | Brown, III et al. ........ 358/1.15 |

FOREIGN PATENT DOCUMENTS

| | | | |
|---|---|---|---|
| EP | 0 578 263 A1 | 1/1994 | |
| EP | A2 0 659 570 | 6/1995 | .............. B41J/5/30 |
| EP | 0 801 357 A2 | 10/1997 | |
| JP | 63-173121 | 7/1988 | .............. G06F/3/12 |
| JP | 4-83663 | 3/1992 | |
| JP | 4-262417 | 9/1992 | .............. G06F/3/12 |
| JP | 5-16592 | 1/1993 | |
| JP | 5-318839 | 12/1993 | |
| JP | 6-242897 | 9/1994 | |
| JP | 7-156464 | 6/1995 | |
| JP | 7-320041 | 8/1995 | .............. G06T/1/00 |
| JP | 8-123633 | 5/1996 | .............. G06F/3/12 |
| JP | 8-276622 | 10/1996 | .............. B41J/5/30 |
| JP | 9-1873 | 1/1997 | .............. B41J/5/30 |
| JP | 9-58091 | 3/1997 | ............ B41J/29/38 |
| JP | 9-169142 | 6/1997 | .............. B41J/5/30 |
| WO | WO 90/12372 | 10/1990 | .......... G06K/15/00 |

* cited by examiner

Primary Examiner—Mark Wallerson
(74) Attorney, Agent, or Firm—Sughrue Mion, PLLC

(57) ABSTRACT

A printer driver is provided in a host computer. When a print job occurs, the printer driver automatically selects the format of a plotting command to be output to a printer. As the command format, there are available two kinds of formats: a high-level printer control language format (for example, PDL), and an intermediate code format expressed in an intermediate language. When the latter format is selected, the printer driver converts a plotting command from an application to an intermediate code and then outputs the intermediate code to the printer. The printer converts the intermediate code to another intermediate code specific to the printer by a very simple processing, and then develops the intermediate code to a bit image, thereby enabling high speed printing.

29 Claims, 14 Drawing Sheets

FIG. 7

| PARAMETER | | PRINTER PAGE | DRIVER PAGE |
|---|---|---|---|
| APPLICATION TYPE | TEXT | 7 | 3 |
| | GRAPHICS | 5 | 5 |
| | BIT IMAGE | 3 | 7 |
| | UNKNOWN | 5 | 5 |
| PRINTER MEMORY | LARGE | 5 | 5 |
| | SMALL | 2 | 8 |
| PRINTER CPU | FAST | 8 | 2 |
| | SLOW | 2 | 8 |
| HOST MEMORY | LARGE | 5 | 5 |
| | SMALL | 7 | 3 |
| HOST CPU | FAST | 5 | 5 |
| | SLOW | 7 | 3 |
| CONNECTION | LOCAL | 5 | 5 |
| | NETWORK | 6 | 4 |

PRINT SYSTEM PRINTER DRIVER AND PRINTER

CROSS REFERENCE

This is a continuation-in-part of U.S. patent application Ser. No. 08/896,947, filed on Jul. 18, 1997, now abandoned the entirety of which is incorporated by reference.

BACKGROUND OF THE INVENTION

1. Field of the Invention

The present invention relates to a print system including a host computer and a printer connected with the host computer and, in particular, to an improvement in a print speedup technology suitable for a print system using a page printer.

2. Description of Related Art

In a page printer, due to the structure of a print engine thereof, after printing has started, it is impossible to stop the feeding of print sheets or to return the print sheets in the reverse direction in the middle of the printing. Also, even when the page printer is not capable of having a bit map memory corresponding to one page, printing must be executed at a speed near the maximum performance of the print engine.

In order to realize the above-mentioned functions, in the prior art, a controller employed in the page printer includes a high-power CPU and a mass storage memory and, in this respect, the controller is more powerful that the host computer.

Also, the controller of the page printer does not translate one or more plotting commands from a host computer directly into one or more bit map images but allows an intermediate code to intervene in the middle of translation from the plotting commands to the bit map images, thereby being able not only to simplify the next and following operations of translation into the bit map images but also to facilitate the conversion of the plotting commands free from the detailed characteristics of the print engine, so that the efficiency of the whole print processing can be improved. Therefore, in the controller of the page printer, a module which interprets a plotting command and creates an intermediate code corresponding to the plotting command is clearly separate from a module which interprets the thus created intermediate code and creates a page of bit map images.

In recent years, the CPU power and memory capacity of a host computer have improved greatly and, as an inevitable consequence of this, the quantity of plotting commands to be supplied to a printer has also increased greatly. As a result, the CPU power and memory capacity of the printer have become insufficient to realize a desired print throughput. Also, there arises a problem that, because the printer is short of memory capacity, there occurs over-memory or irreversible compression so that perfect printing cannot be realized.

However, from the viewpoint of cost reduction, it is difficult to increase the power of the controller and hardware of the printer or to increase the number of memories thereof. Similar problems are found not only in the page printer but also in a system which uses a printer of another type such as a serial printer or the like.

In view of the above, it is an object of the invention to provide an improved print system which can improve the throughput of the whole system even without enhancing the throughput of a printer itself.

It is another object of the present invention to provide a printer in which image development can be started immediately after the start of sending the printing data to the printer.

SUMMARY OF THE INVENTION

In attaining the objects, according to the invention, there is provided a print system which includes a host computer and a printer connected with the host computer. In the present print system, the host computer includes a printer driver which is used to generate print job data including one or more plotting commands to be given to the printer, while the printer driver further includes intermediate level job data generating means used to generate intermediate level print job data including plotting commands at least part of which are expressed in the format of a first intermediate code. Also, the printer includes intermediate code conversion means which is used to receive intermediate level print job data and converts the plotting commands of the intermediate level job data into a second intermediate code, and third conversion means which is used to convert the second intermediate code into bit image data for printing.

According to the present print system, in the host computer, part or all of the plotting commands are converted to the intermediate code format before being transmitted to the printer. Therefore, in the printer, there can be omitted a processing which converts the plotting commands written in a high-level language to the intermediate code. In this manner, according to the invention, since the intermediate code generation processing, which has been conventionally performed only in the printer, can be shared by the host computer, especially when the memory or CPU of the host computer has capabilities to spare, and the printing speed of the printer can be enhanced.

The printer driver further may include high-level job data generation means used to generate high-level print job data in which the plotting commands thereof are all expressed in a high-level printer control language, and mode select means used to select one of the intermediate level job data generation means and the high-level job data generation means. In this case, the printer further may include graphics means which is used to convert the plotting commands expressed in the high-level printer control language to the second intermediate code.

In this structure, two operation modes can be used selectively on a case-by-case basis: that is, an operation mode in which all the plotting commands with respect to the printer are expressed in the high-level printer control language as in the prior art; and, an operation mode in which the plotting commands are in part or wholly converted to the intermediate code. In this case, it is preferable that selection of one of the two operation modes can be decided automatically. In a preferred embodiment of the invention, the operation mode can be selected automatically by synthetically considering the kinds of application programs, the capabilities of the printer, and the capabilities of the host computer.

Also, when selecting the operation mode automatically, the operation mode may be decided according to a print job unit; or, a page unit, a band unit, or a plotting command unit; or, an application program unit.

The print job data can also be formed such that it includes specification information for specifying which plotting commands are converted to the intermediate code. For example, when all the plotting commands are converted to the intermediate codes, the print job data can declare in the head portion thereof to the effect that all the plotting commands are converted to the intermediate codes. Also, when only the specific pages, specific bands, or specific commands are converted to the intermediate codes, the declaration to this effect can be set in the head of the specific pages, bands or commands. Such declaration, that is, such specification information, can be described in the printer control language.

From the viewpoint of relieving the processing burden of the printer, it is preferred that the first intermediate code to be generated by the printer driver and the second intermediate code to be generated by the printer be in the same format. However, there is a possibility that, since the roles of the two intermediate codes are different from each other, they can be different in the details thereof. For example, the first intermediate code must include bit image data on the individual characters to be plotted and on the individual images to be plotted. On the other hand, in an ordinary printer, such bit image data is managed at a different storage location from the intermediate code and, therefore, the second intermediate code does not include such bit image data.

According to another aspect of the invention, there is provided with a printer of the present invention comprises: band end detecting means for detecting an end of each band by a received intermediate code; image developing means for developing an image of each band in accordance with the intermediate code, which has already been received, in response to the detection of the end of each band; and a printing engine for conducting printing in accordance with the developed image. According to this printer, an end of each band is detected by the received intermediate code, and when the end of the band is detected, image development of the band is started. Consequently, when the sending of printing data of the type of the intermediate code is started, the intermediate code of the first one band is registered in the printer. At this time, image development is started.

It is possible for the printer to conduct image development by a band which is smaller than the band of the intermediate code made by the printer driver. In this case, it is preferable that a size of the band of the intermediate code made by the printer driver is given by integral multiples of the size of the band, the image development of which is conducted by the printer.

The printer driver of the present invention divides each page of a document to be printed into a plurality of bands, generates an intermediate code of each band and adds information expressing an end of each band to the generated intermediate code. When the above printer driver is used, the printer receives an intermediate code containing an end information of each band. Therefore, it is possible to recognize the end of each band. For the above reasons, it is possible for the printer to start a band image development at a stage in which the intermediate code of the first one band has been received.

The printing system of the present invention is provided with the above printer driver and the printer.

Typically, the printer of the present invention is executed when a microcomputer provided in the printer is programmed so that the above function can be exhibited. It is possible to execute the printer driver of the present invention when the host computer capable of communicating with the printer is programmed so that the above function of the printer driver can be exhibited. The necessary program can be installed or loaded into an objective computer via various mediums such as a semiconductor memory, disk type storage and communicating line.

The intermediate code having the above specific structure, which is generated by the printer driver of the present invention, can be supplied to the printer via various mediums such as a semiconductor memory, disk type storage and communicating line. When the intermediate code is supplied to the printer, the printer can start printing at a time which is only a little delayed from the start of supply.

BRIEF DESCRIPTION OF THE DRAWINGS

FIG. 7 is a table of evaluation points which are used to decide a page mode;

DETAILED DESCRIPTION OF THE PREFERRED EMBODIMENT

Figure 1:
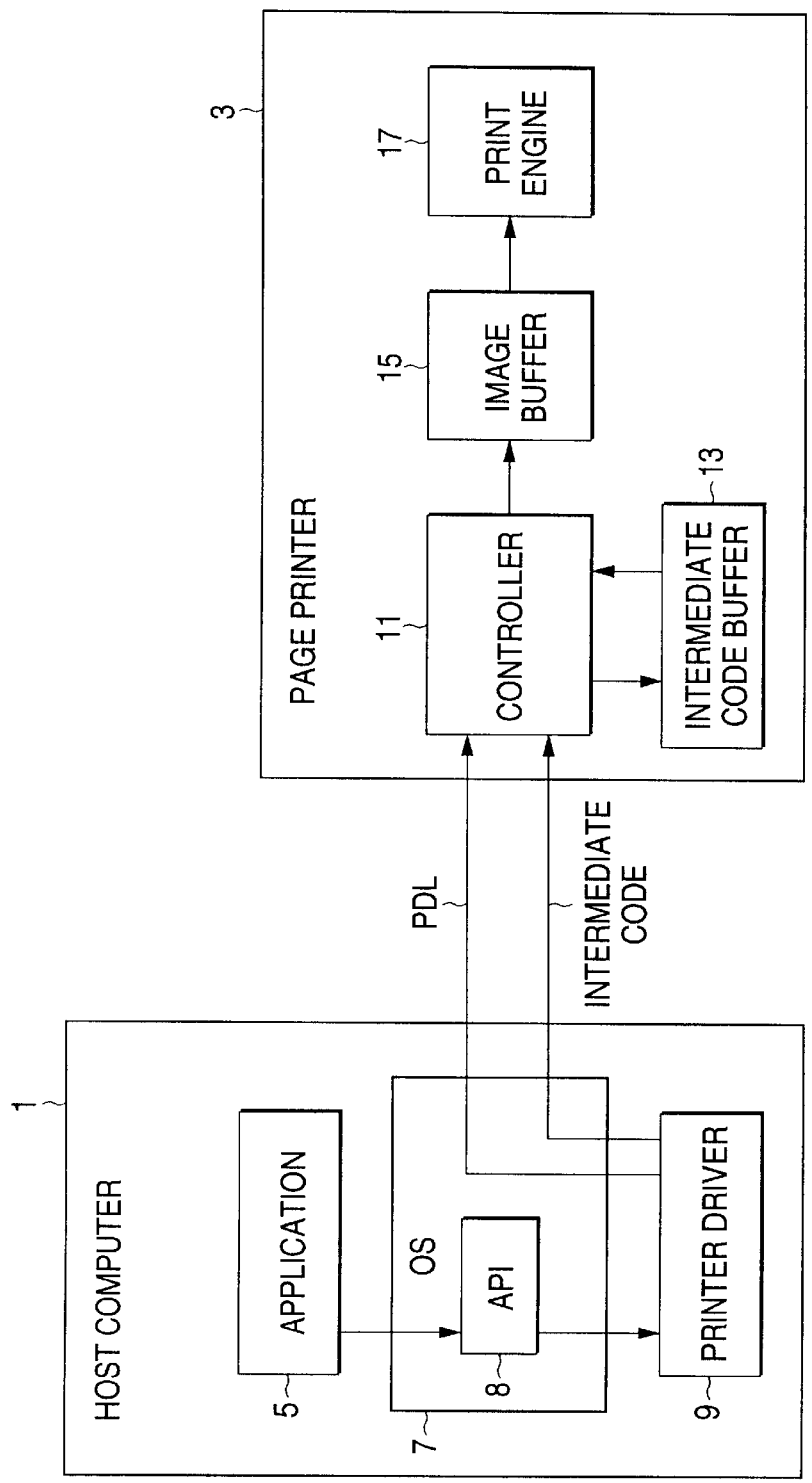
FIG. 1 is a block diagram of the overall structure of an embodiment of a print system according to the invention.

FIG. 1 shows the overall structure of an embodiment of a print system according to the invention.

The present print system includes a host computer 1 and a page printer 3 connected to the host computer 1. In the host computer 1, an application program 5 notifies the start of a new print job to a plotting module (which is hereinafter referred to as "an application programming interface (API) module") 8 provided within an operating system (OS) 7, and sends the call of the plotting function of the API to the API module 8. In response to this, the API module 8 sends a printer driver 9 the call of the plotting function of the printer driver 9 (which is hereinafter referred to as "a device driver interface (DDI) call").

The printer driver 9 converts the DDI call into a print command in an output format which can be recognized by the page printer 3. The output format includes two kinds of output formats. One of them is a high-level language which is generally referred to as a printer control language and, in the present embodiment, this corresponds to a Page Description Language (PDL). The other output format is an intermediate (IM) code which is described in an Intermediate Language (IML). This intermediate code is basically the same format as an intermediate code which is generated from PDL by a controller 11 provided in the page printer 3, but they are a little different in the details from each other. Hereinafter, in order to distinguish them from each other, the intermediate code to be generated by the printer driver 9 is referred to as a driver intermediate (DIM) code, whereas the intermediate code to be generated by the page printer 3 is referred to as a printer intermediate (PIM) code.

The DIM code is different from the PIM code mainly in that it includes image bit map data on characters and bit images. That is, when a certain band, with characters and bit images drawn therein, is described in an intermediate code, within the printer, the bit map data on the respective characters and bit images are placed in other memory areas than the PIM code, while pointers to the respective characters and bit images in these memory areas are described in the PIM code. On the other hand, in the DIM code, there are placed not only the characters and bit images but also the bit map data on such characters and bit images. In this case, in order to avoid the repetition of the bit map data, for example, the following format can be employed. That is, only when the characters and bit images appear for the first time within the band, the bit map data on the characters and bit images are placed or registered in the DIM code together with the identification numbers and the size specifications thereof and, next, the identification numbers of the characters and bit images, the coordinates thereof within the band, the specifications of the actually used portions of the thus registered bit map data, and the like are described. After that, each time the same characters and bit images appear again within the same band, the identification numbers of the characters and bit images, the coordinates thereof within the band, the specifications of the actually used portions of the thus registered bit map data are described.

Also, generally, the PIM code within a printer supports a great variety of plotting functions. On the other hand, the DIM code must be matched to the function of the DDI that is supplied by the OS 7 and, therefore, if the function of the DDI is more limited than the function of the PIM code, for example, in the passes, graphics parameters, kinds of coordinate conversion function calls and the like, then the function of the DIM code is similarly more limited than the function of the PIM code in the above-mentioned respects.

The print command from the printer driver 9 is sent through the OS 7 to the printer 3. In the printer 3, the controller 11 interprets the print command and converts it into a PIM code. Here, when the controller 11 receives a print command expressed in the PDL, the controller 11 interprets the PDL command and converts it into a PIM code according to the same procedure as a conventional printer follows. On the other hand, on receipt of a DIM code, the controller 11 generates a PIM code by means of very simple conversion (that is, a conversion which merely cancels the above-mentioned differences). Therefore, the amount of processing of the controller 11 is very small when it receives the DIM code.

The controller 11 stores the thus generated PIM code into the intermediate code buffer 13. Also, in synchronization with the operation of the print engine 17, the controller 11 creates bit image data from the PIM code stored in the intermediate code buffer 13 and develops it to the image buffer 15. Here, under a specific condition that the bit map data is more advantageous than the PIM code in the amount of memory required and/or processing speed, the controller 11 pre-develops the PIM code to the bit map image before it develops the same to the image buffer 15.

The print engine 17 reads out the bit map image from the image buffer 15 and prints it on a printing sheet.

Here, the page printer 3 may include a receive buffer which is capable of provisionally storing a print command from the host computer 1.

Figure 2:
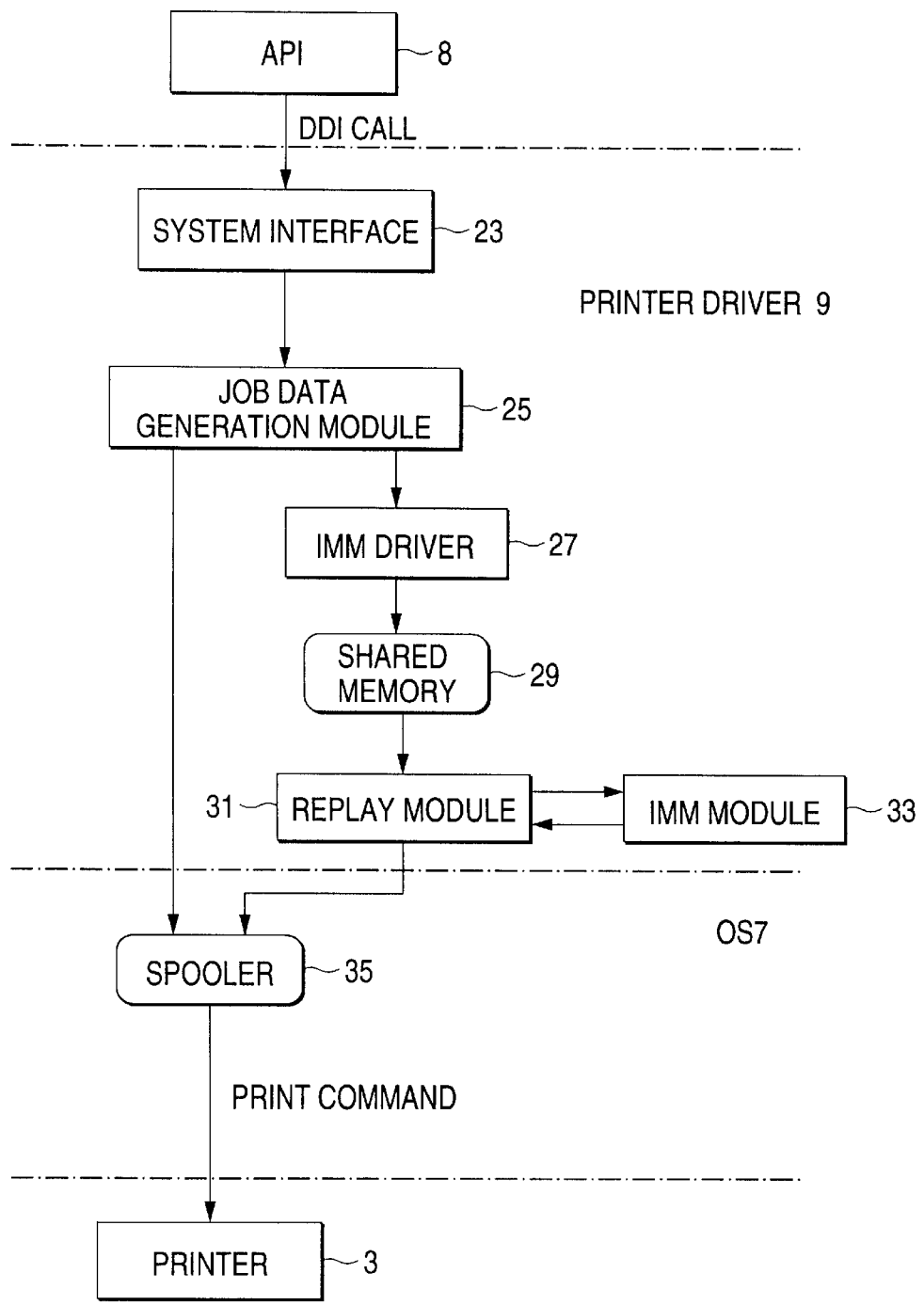
FIG. 2 is a block diagram of the functional structure of a printer driver 9 provided within a host computer 1.

FIG. 2 shows the functional structure of the printer driver 9 included in the host computer 1.

A system interface 23, on receipt of a DDI call for a new print job from the API 8, decides a page mode and then allows a job data generation module 25 to execute a plotting processing in accordance with the DDI call. Here, "to decide a page mode" means to decide whether the output format of a print command to be output to the printer is a PDL format or a DIM code format. A mode to output the print command in the PDL format is referred to as a "printer page mode", whereas a mode to output the print command in the DIM code format is referred to as a "driver page mode". A method for deciding the page mode will be described in detail later.

Figure 3:
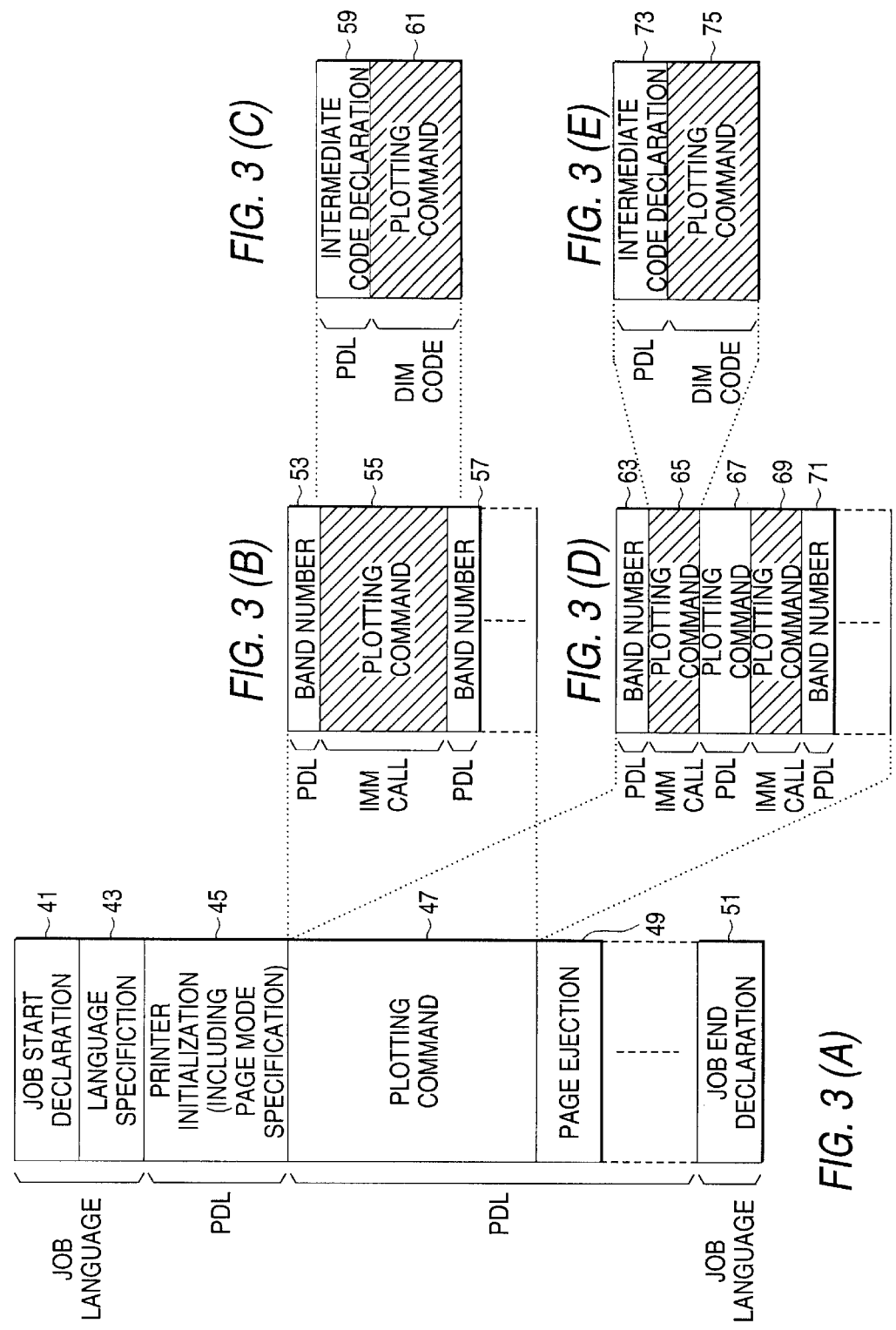
FIG. 3 is an explanatory view of an example of job data.

In the printer page mode, the job data generation module 25 executes a plotting processing which corresponds to a DDI call delivered from the system interface 23 and, as a result of this, a print command chain relating to a print job (which is hereinafter referred to as job data) is generated in such format as shown in FIG. 3(A).

The job data shown in FIG. 3(A) starts with a job start declaration 41, and a language specify command 43 and a printer initialize command 45 follow sequentially after the job start declaration 41. After that, plotting commands 47 in pages follow, while a page eject command 49 is added to the end of each of the plotting commands 47 in the respective pages. A job end declaration 51 is placed after the last plotting command 47 in the last page, which ends the job data.

The first job start declaration 41, language specify command 43 and the last job end declaration 51 are expressed in a high-level language called a job language which is independent of a printer control language. The language specify command 43 specifies a printer control language to be used in the present job data and, in the present embodiment, a given PDL is specified as the language specify command 43.

Commands 45 to 49 following the language specify command 43 are respectively expressed in a given PDL specified by the language specify command 43. The printer initialize command 45 is used to initialize the environment or state of the printer. In the printer initialize command 45, there is also included the specification of a page mode and, here, a printer page mode is specified.

The plotting command 47 following the printer initialize command 45, as mentioned before, is described in the PDL in pages.

Now, referring again to FIG. 2; such job data as shown in FIG. 3(A), which is output from the job data generation module 25, is written into a spooler 35 provided within the OS 7. After that, the job data is transmitted from the spooler 35 to the printer 3.

On the other hand, in the case of the driver page mode, with respect to the plotting processing calls for the respective pages among the DDI calls delivered from the system interface 23, instead of the job data generation module 25, there is invoked an IMM driver 27 and the IMM driver 27 generates a function call (which is hereinafter referred to as "an IMM call") with respect to an intermediate code generation module (which is hereinafter referred to as "an IMM module") which will be discussed later. As a result of this, among the job data shown in FIG. 3(A), the portions of the respective pages that correspond to the plotting commands 47 are respectively expressed in the form of IMM calls not in the form of the PDL.

FIG. 3(B) shows an example of the plotting command that is expressed in the IMM call and, in this example, a page is divided into one or more bands and the plotting command 55 of each band is expressed in the IMM call. To the heads of the plotting commands 55 of the respective bands, there are attached band number declarations 53 which show the start of the respective bands. The band-number declarations 53 are respectively expressed in the PDL. Therefore, from the IMM driver 27, there are output job data in a format obtained by replacing the portions of the job data of FIG. 3(A) that correspond to the plotting commands 47 of the respective pages with such expressions as are shown in FIG. 3(B). By the way, in the present job data, the driver page mode is specified within the printer initialize command 45.

The job data from the IMM driver 27 is delivered through shared memory 29 to a replay module 31. Here, delivery of the job data to the replay module 31 is basically executed through the shared memory 29 but, in the case of the job data having a large record size, the job data is arranged as a file and the name of the file is written into the shared memory 29.

The replay module 31 passes therethrough the portions of the job data that are expressed in the job language and PDL, that is, the job start declaration 41, language specify command 43, printer initialize command 45, band number declaration 53 and page eject command 49 respectively shown in FIGS. 3(A) and (B), as they are, and writes them into the spooler 35.

On the other hand, with respect to the plotting command 55 in the format of the IMM call shown in FIG. 3(B), the replay module 31 calls the plotting function of the IMM module 33. The plotting function of the IMM module 33 converts the present plotting command 55 to a DIM code (that is, a driver intermediate code).

FIG. 3(C) shows an example of a plotting command 61 included in each of the bands and converted to the DIM code and, to the head of the plotting command 61, there is attached a declaration 59 indicating that the plotting command 61 is an intermediate code (that is, binary data). This intermediate code declaration 59 is expressed in the PDL.

Therefore, from the replay module 31, there is output job data in the format that is obtained by replacing the plotting command 47 of each page of the job data shown in FIG. 3(A) with one shown in FIG. 3(B) and further by replacing the plotting command 55 of each band shown in FIG. 3(B) with one shown in FIG. 3(C).

Figure 4:
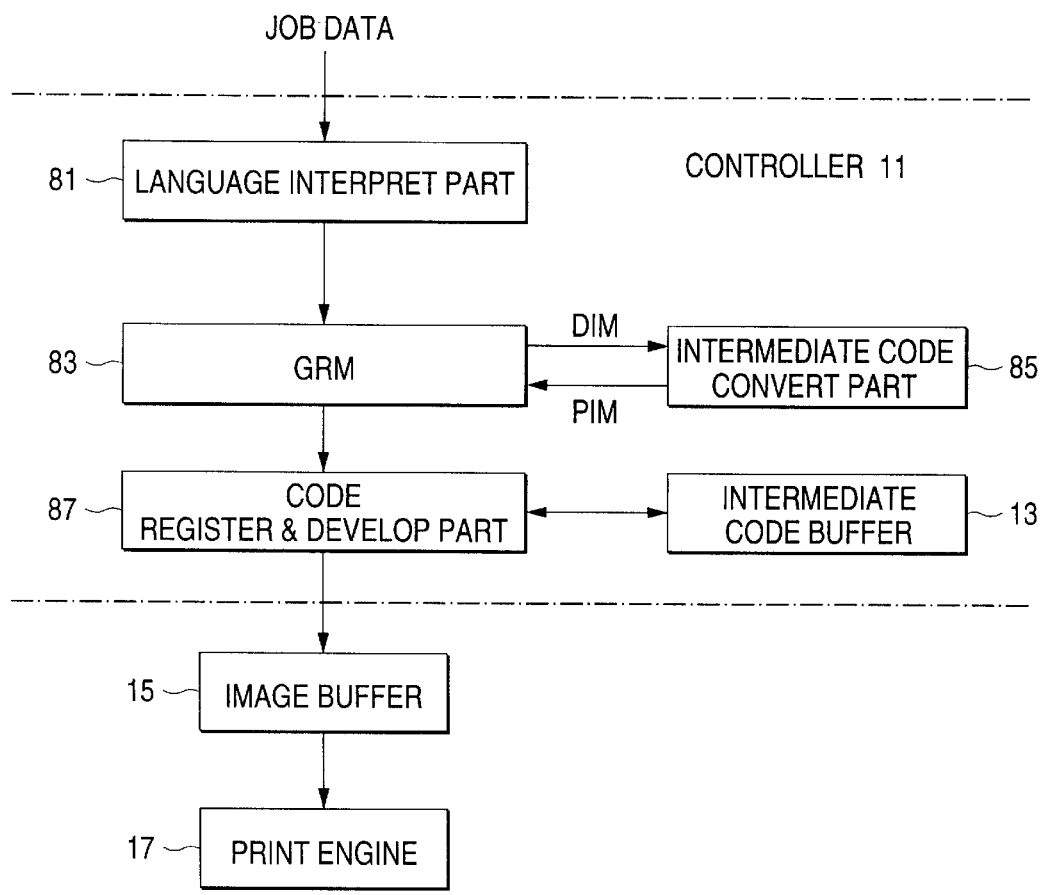
FIG. 4 is a block diagram of the functional structure of a controller 11 provided in a printer 3.

FIG. 4 shows the functional structure of the controller 11 of the printer 3.

In the controller 11, on receipt of the job data, at first, a language interpret part 81 interprets a command included in the job data and expressed in a job language and PDL and, in accordance with the interpretation result, calls the plotting function of a graphics module (which is hereinafter referred to as "GRM"). When the DIM code is included in the job data, the language interpret part 81 calls an intermediate code conversion part 85 through the GRH 83 and hands the DIM code over to the intermediate code conversion part 85.

The GRM 83 has a function to generate a PIM code (a printer intermediate code) in accordance with a plotting command expressed in the PDL. Also, the intermediate code conversion part 85 is a function which is added to the GRM 83 in order to convert the DIM code to the PIM code. Here, a processing for converting the DIM code to the PIM code is very simple when compared with a processing to be performed by the GFM 83, as was described before. Therefore, for the printer page mode, in accordance with the result of the interpretation by the language interpret part 81, the GRN 83 generates a PIM code. On the other hand, for the driver page mode, the intermediate code conversion part 85 generates the PIM code from the DIM code included in the job data by means of simple conversion. Here, when it is more advantageous to convert the DIM code to bit map data from the beginning than to convert the DIM code to the PIM code, the DIM code may also be pre-developed to the bit map data. In both modes, the generated PIM code is delivered from the GRM 83 to a PIM code register & develop part 87. The PIM code register & develop part 87 registers the PIM code in the intermediate code buffer 13 and, in synchronization with the operation of the print engine 17, reads out the PIM code from the intermediate code buffer 13 and develops a bit map image on the image buffer 15 in accordance with the read-out PIM code.

Now, description will be given below in more detail of the operation of the above-mentioned structure.

Figure 5:
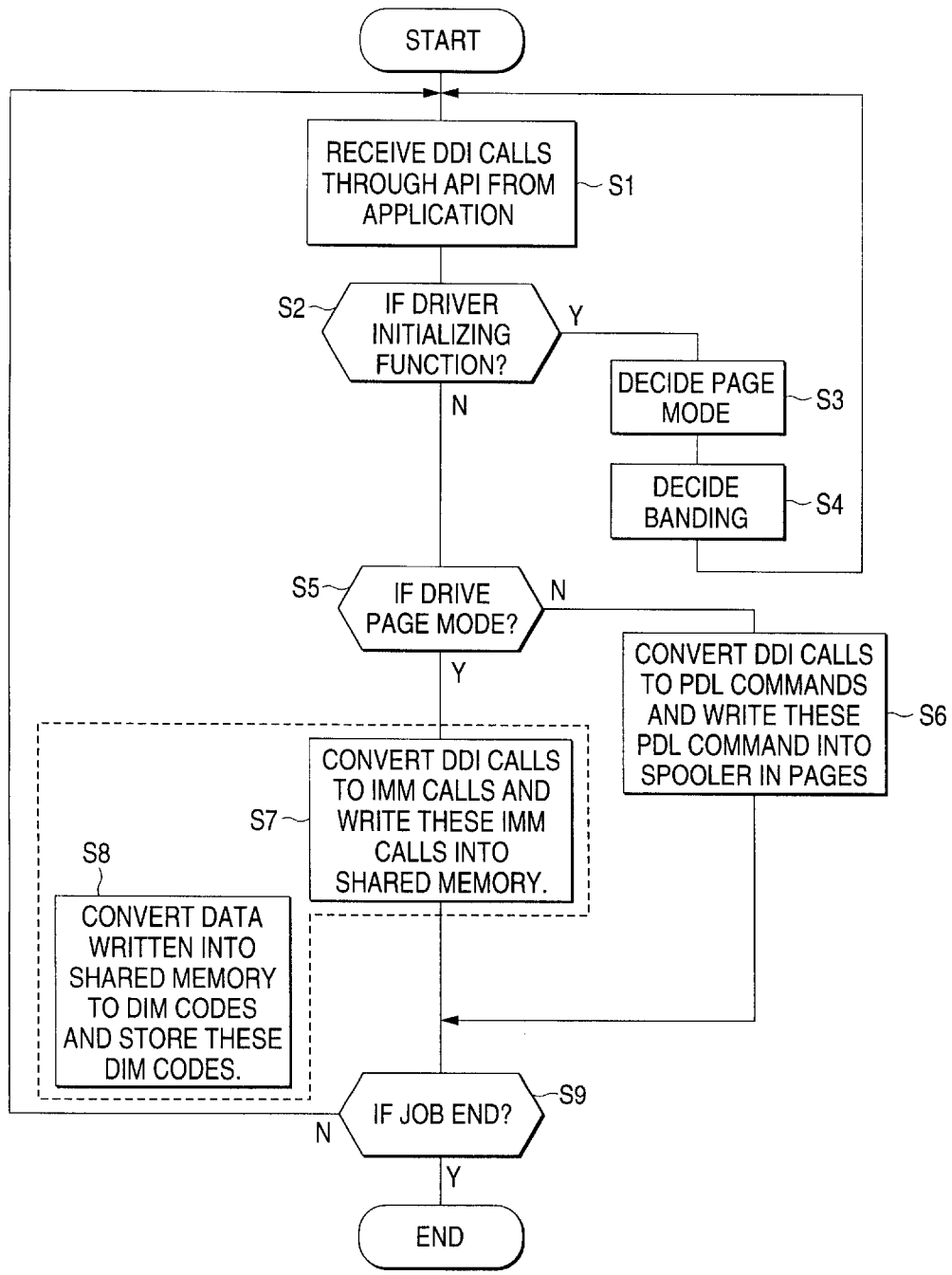
FIG. 5 is a flow chart of the overall flow bf a processing to be performed by the printer driver 9.

FIG. 5 shows a flow chart of the overall flow of the processing to be performed by the printer driver 9.

At first, the printer driver 9 receives the DDI call from the API 8 (S1), if the initialize function of the driver 9 is invoked by the present DDI call (Y in S2), then not only is page mode decided (S3) but also banding (S4) is decided in the present initialize processing. These decisions are executed according to the flows that are respectively shown in FIG. 6.

Figure 6:
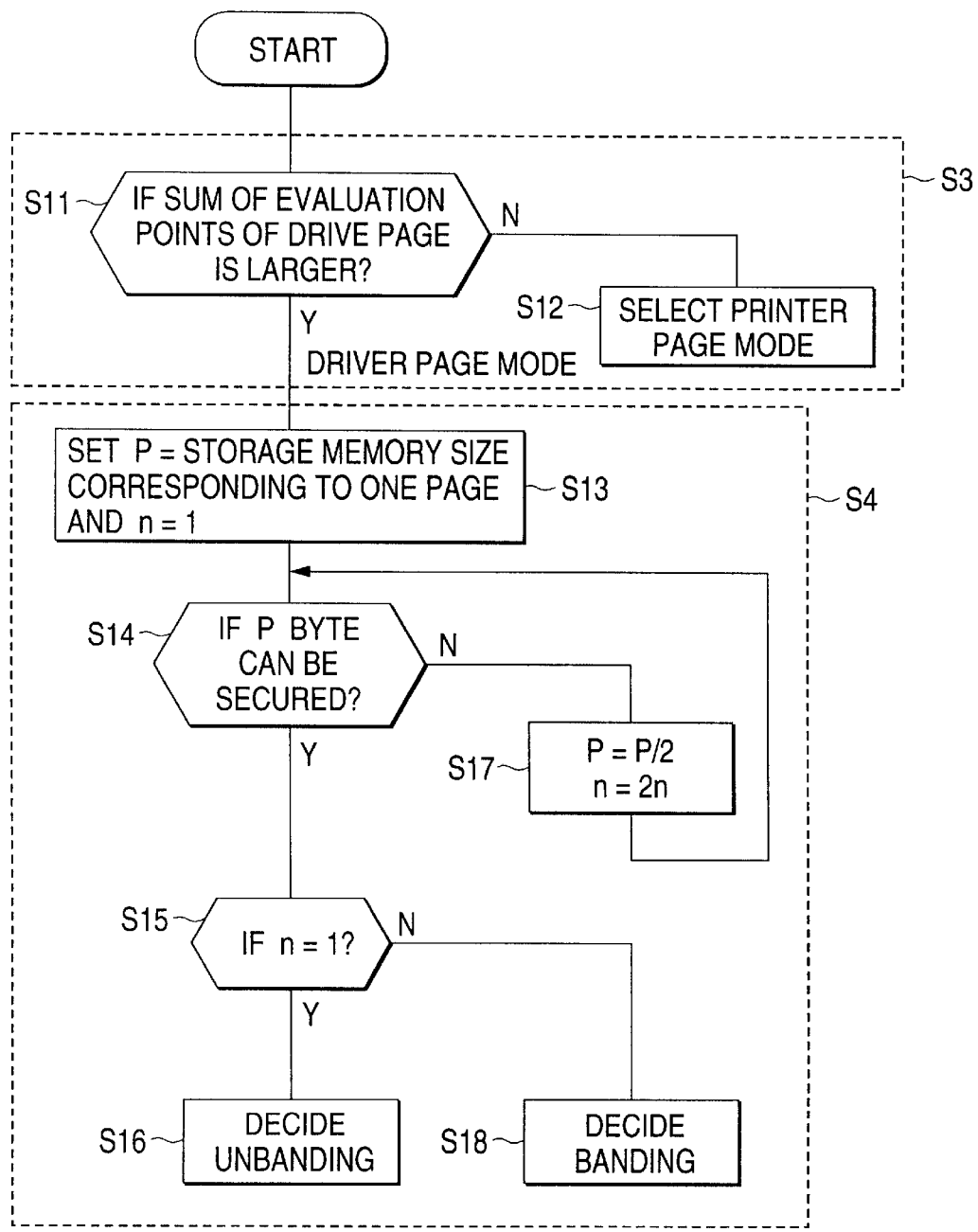
FIG. 6 is a flow chart of a page mode decision processing and a banding decision processing.

As shown in FIG. 6, in the operation mode decision processing (S3), at first, evaluation points are calculated with respect to the printer page mode and driver page mode, and page mode is selected which has the greater evaluation points (S11, S12). Here, the calculation of the evaluation points is executed according to an evaluation point table which, as shown in FIG. 7, shows the evaluation points of the respective modes with respect to various parameters.

In the example shown in FIG. 7, as the parameters, there are available an application type, a printer memory size, a printer CPU speed, a host computer size, a host computer CPU speed, a connection form between the host and printer, and the like. Here, the term "application type" is used to distinguish the types of the applications 5 from each other. That is, whether the application 5 is an application of a type that is mainly used to handle characters (such as a text editor, a word processor, or the like), a type that is mainly used to handle graphics forms (such as CAD, draw-system graphics, or the like), or a type that is mainly used to handle images (such as photo-retouch, paint-system graphics, or the like). As can be seen from FIG. 7, the parameters can be evaluated in the following manner. That is, when the quantity of data to be processed is large or the power of a printer is low, the evaluation point of the driver page mode is high. On the other hand, when the quantity of data to be processed is small or the capability of a host computer is low, the evaluation point of the printer page mode is high. The evaluation points of these parameters are summed up for each of the two modes and the sum values of the evaluation points of the two modes are compared with each other. The mode that is found higher in the sum value is selected.

By the way, when the present print job is to plot characters using fonts prepared within the printer, the following technique can also be employed.

That is, as shown in FIG. 3(D), in this technique, it is arranged that certain plotting commands 65 and 69 in one band are expressed in the IMM call, the other command 67 is expressed in the PDL and, after that, as shown in FIG. 3(E), the IMM calls 65 and 69 are converted to a DIM code 75. Under this arrangement, when there is included a command to plot characters using the printer fonts, the command 67 is expressed in the PDL as conventionally and thus the command 67 is allowed to exist together with the plotting commands 65 and 69 expressed in the IMM call. For this reason, although the portion of the command to plot characters using the printer fonts can be processed only at the same speed as the conventional processing speed, the other portions thereof are allowed to generate intermediate codes on the printer driver side, with the result that the present print job as a whole can be processed at high speed.

Also, as an alternative method, it is also possible to rewrite the command for plotting characters using the printer fonts into a command which plots characters using fonts provided on the host computer side. This makes it possible to handle the present command in the same manner as the other plotting commands 65 and 69 expressed in the IMM call, so that an intermediate code can be generated on the printer driver side.

Now, referring again to FIG. 6, if the driver page mode is selected, then the banding decision processing (S4) is executed. At first, the number of bytes of a memory necessary to store DIM codes corresponding to one page is estimated, the estimated byte number is set in a variable P, and the initial value 1 of the band number is set in a variable n (S13). Next, it is checked whether a P byte memory can be actually secured or not (S14). If it is found that n=1, then an unbanding processing (that is, a page is not divided into two or more bands but is processed as a band) is decided (S16). Here, the larger the size of the P byte is, the less frequently the plotting element is divided, which reduces the number of times of replay to thereby reduce the driver processing time, resulting in improved performance of the overall processing. On the other hand, when the P byte cannot be secured, P is divided by 2 and n is doubled (S17) and, after that, it is checked whether or not the P byte can be secured (S13). If the P byte cannot be secured, then P is divided by 2 and n is doubled again (S17). This operation is executed repeatedly until the P byte can be secured. If the P byte can be secured, then the memory area of the P byte is secured as a buffer for the DIM code and there is decided such a banding processing as can divide a page by the band number that is indicated by the current n (S18). By the way, in the case of the printer page mode, since the plotting contents are described in the PDL in pages, an unbanding processing is inevitably decided.

Referring again to FIG. 5, after the above-mentioned driver initialization procedure is ended, depending on whether the mode is the printer page mode or driver page mode (S5), as described before, the main operation of the plotting processing is assigned to the job generation module 25 or IMM driver 27. That is, if the mode is the printer page mode, then the plotting function of the job generation module 25 is called by the plotting DDI call, plotting commands in the PDL are thereby generated, and the thus generated PDL commands are respectively written into the spooler 35b in pages (S6).

On the other hand, for the driver page mode, the function of the IMM driver 27 is invoked by the plotting DDI call, a function call for the IMM module 33 is thereby generated, and the thus generated function call is then written into the shared memory 29 (S7). Also, asynchronously with the writing of the function call into the shared memory 29, in response to an IMM function call within the shared memory 29, the replay module 31 calls the IMM module 33, generates a DIM code, and writes the thus generated DIM code into the spooler 35 (S8). The above-mentioned processing is performed repeatedly until a DDI call indicating the end of the job appears (S9).

Figure 8:
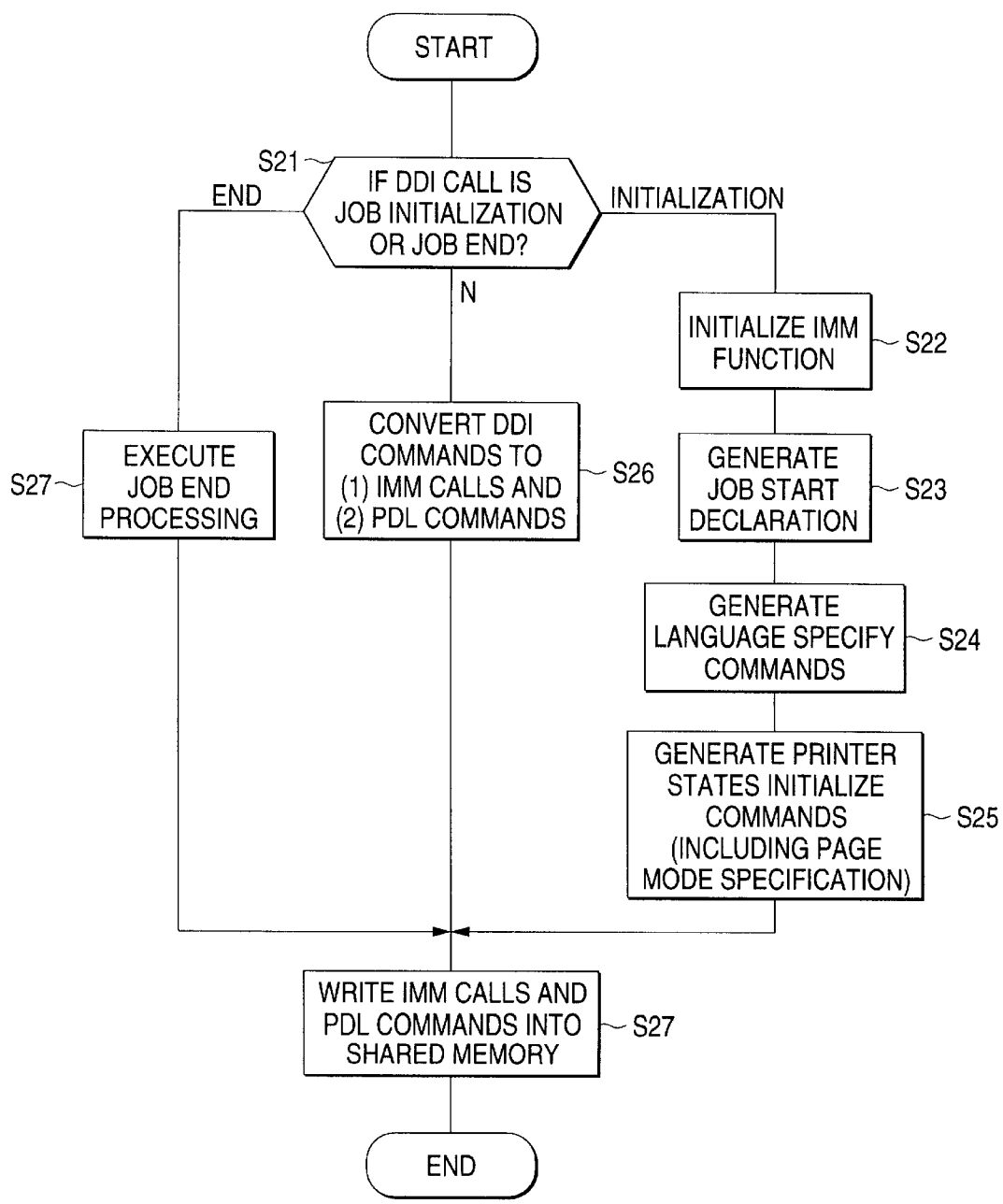
FIG. 8 is a flow chart of the details of a processing to be performed in Step 57 shown in FIG. 5.

FIG. 8 shows the details of the above-mentioned processing to be performed in Step 57 shown in FIG. 5. This processing is executed by the job data generation module 25 and INM driver 27 shown in FIG. 2.

At first, a DDI call for initialization of the print job is received (S21). In response to this, there are generated not only a command for initialization of the function of the IMM module 33, but also the start declaration 41, language specify command 43 and printer initialize command 45 (including the specification of the page mode) respectively shown in FIG. 3(A) (S22 to S25), and they are written into the shared memory 29 (S28). After that, a DDI call for the plotting processing of each page is received. In response to this, for every band within each page, there are generated the plotting command 55 in the form of an IMM call and band number declarations 53 and 57 expressed in the PDL, which are respectively shown in FIG. 3(B), and they are then written into the shared memory 29 (S28). Finally, a DDI call for ending the job is received and, in response to this, there is generated the job end declaration 51 shown in FIG. 3(A) (S27), and the thus generated job end declaration 51 is written into the shared memory 29 (S28).

Figure 9:
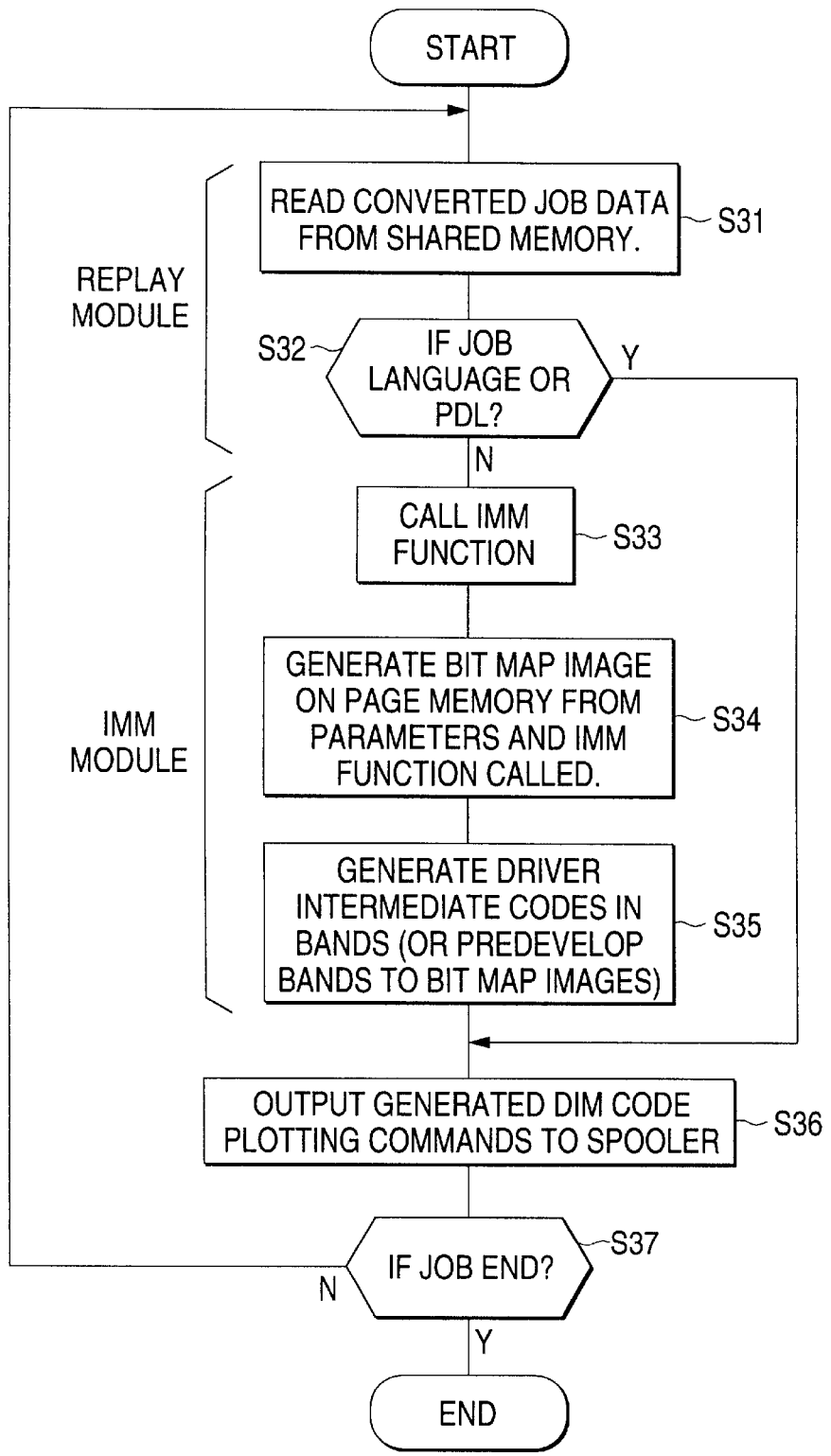
FIG. 9 is a flow chart of the details of a processing to be performed in Step 58 shown in FIG. 5.

FIG. 9 shows the details of the processing to be performed in Step 58 shown in FIG. 5. This processing is executed by the replay module 31 and IMM module 33 shown in FIG. 2.

Figure 10:
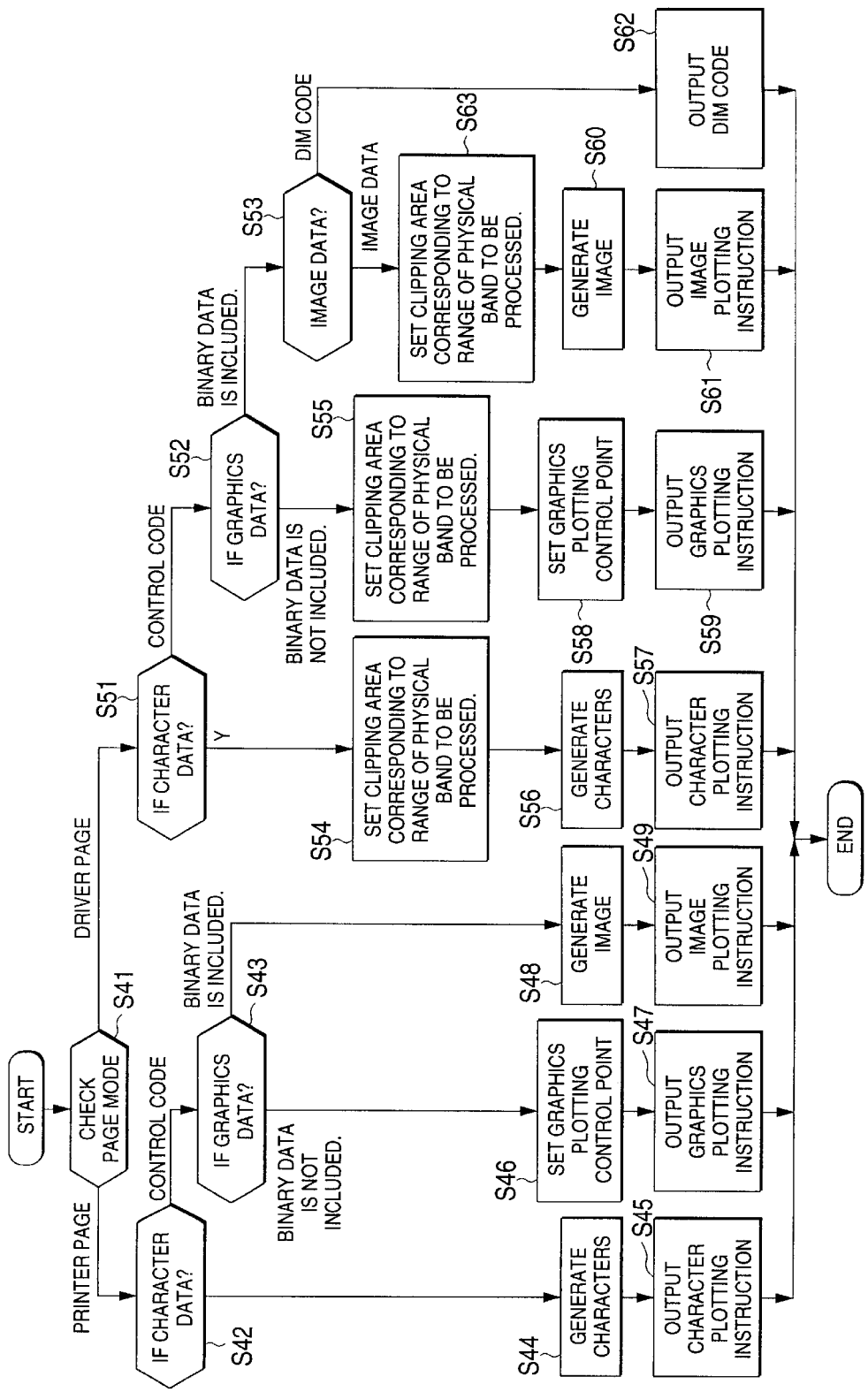
FIG. 10 is a flow chart of a processing to be performed by a language interpret part 81 of the controller 11 in the printer 3.

First, the replay module 31 reads out job data from the shared memory 29 (S31) and checks whether or not a command included in the thus read-out job data is a command described in a job language or a command described in the PDL (S32). Then, if it is found that the command in the job data is described in the job language or PDL, then the command, as it is, is output to the spooler 35 (Y in S32). On the other hand, for an IMM call in the job data, there is invoked a plotting function which is stored in the IMM module 33 and corresponds to the IMM call (S33), and a plotting processing is executed using, the parameters of the present IMM call (S34). In the plotting processing, at first, bit map data on characters and bit images are developed onto a previously secured page memory (or band memory) (S34) and, in bands, there are generated such plotting commands 61 in the form of DIM codes as shown in FIG. 3(C) (S35). In this operation, according to the case, as described before, the respective bands may be pre-developed to the bit map images not in the form of DIM codes. After that, the thus generated DIM code plotting commands 61 are output to the spooler 35 (S36). The above-mentioned processing is performed repeatedly until the last portion of the job data is finished (S37). FIG. 10 shows the details of the processing to be performed by the language interpret part 81 of the controller 11 provided within the printer, which is already shown in FIG. 4.

At first, it is checked from the page mode specification of the job 4ata received from the host computer 1 whether the page mode is a printer page mode or a driver page mode (S41). If the printer page mode is specified, then the respective plotting commands of the job data expressed in the PDL are interpreted and it is checked from the results of such command interpretation whether each plotting command is a command to plot characters or not (that is, whether it includes character data or not) (S42), or a command to plot bit images or not (whether it includes binary data or not) (S43), or a command to plot graphics (figures) or not (whether it includes graphics data or not), that is, (whether it includes neither character data nor binary data or not). If the command to plot characters is received, then the bit map data of the characters are generated (S44) and, then a character plotting instruction is given to GRM 83 (S45). If the command to plot graphics is received, then the plotting control point of the graphics is set (S46) and, after that, a graphics plotting instruction is given to the GRM 83 (S47). If the command to plot bit images is received, then the bit map data of the bit images is created (S48) and, then an image plotting instruction is given to the GRM 83 (S49). In accordance with such plotting instruction, the GRM 83 generates a PIM code and then writes the same into the intermediate code buffer 13. On the other hand, if the driver page mode is specified, then the plotting command in the form of a DIM code, as it is, is output to the GRM 83 (562). In response to this, as described before, the GRM 83 invokes the intermediate code convert part 85 to thereby convert the DIM code to the PIM code. This conversion processing is so simple that it can be executed at a high speed.

As described above, in the present embodiment, for each print job, the printer page mode or driver page mode is selected and, for the driver page mode, the plotting command is converted to the intermediate code by the printer driver before it is supplied to the printer. This relieves the processing burden of the printer to thereby be able to enhance the processing speed of the printer. Therefore, by selecting the driver page mode properly according to the state of the entire system, the processing speed of the whole system can be improved. By the way, in the above-mentioned embodiment, in the driver page mode, the plotting commands of all pages are expressed in the intermediate code form. However, the invention is not always limited to this but, for example, some pages may be expressed in the intermediate code, whereas the other pages may be expressed in the PDL. That is, the intermediate code conversion processing may be controlled in pages. Or, the intermediate code conversion processing may be controlled in applications.

Also, the above conversion processing can be controlled in bands or in commands. In particular, when the processing is controlled in bands, for example, the plotting commands of certain bands are converted to the IMM code as shown in FIGS. 3(B) and (C) before they are converted to the DIM code, whereas the plotting commands of the other bands are expressed in the PDL. On the other hand, when the processing is controlled in commands, at first, as shown in FIG. 3(D), certain commands 65 and 69 in a band are expressed in the IMM call and the other band 67 is expressed in the PDL and, then, as shown in FIG. 3(E), the IMM calls 65 and 69 are converted to the DIM code 75.

As mentioned above, when, in the driver page mode, the plotting commands expressed in the PDL and in the DIM code are allowed to be present together in one piece of job data. In the language processing by the printer shown in FIG. 10, there are necessary steps (S51, S52, S53) to distinguish the plotting commands expressed in the DIM code from the plotting commands expressed in the PDL. That is, in the driver page mode, if the PDL command to plot characters is received (Y in 551), then a clipping area corresponding to the range of a physical band to be processed is firstly set (554), the bit map data on the characters is then generated (556), and a character plotting instruction is given to the GRM 83 (557). Also, if the command to plot graphics is received, similarly, a clipping area corresponding to the range of a physical band to be processed is firstly set (555), the plotting control point of the graphics is then set (558) and, after that, a graphics plotting instruction is given to the GRM 83 (559). Further, if the command to plot bit images is received, similarly, a clipping area corresponding to the range of a physical band to be processed is firstly set (563), the bit map data on the bit images is created (560) and, after that, an image plotting instruction is given to the GRM 83 (561). On the other hand, if the command expressed in the intermediate code is received, then the command, as it is, is delivered to the GRM 83 (562).

Figure 11:
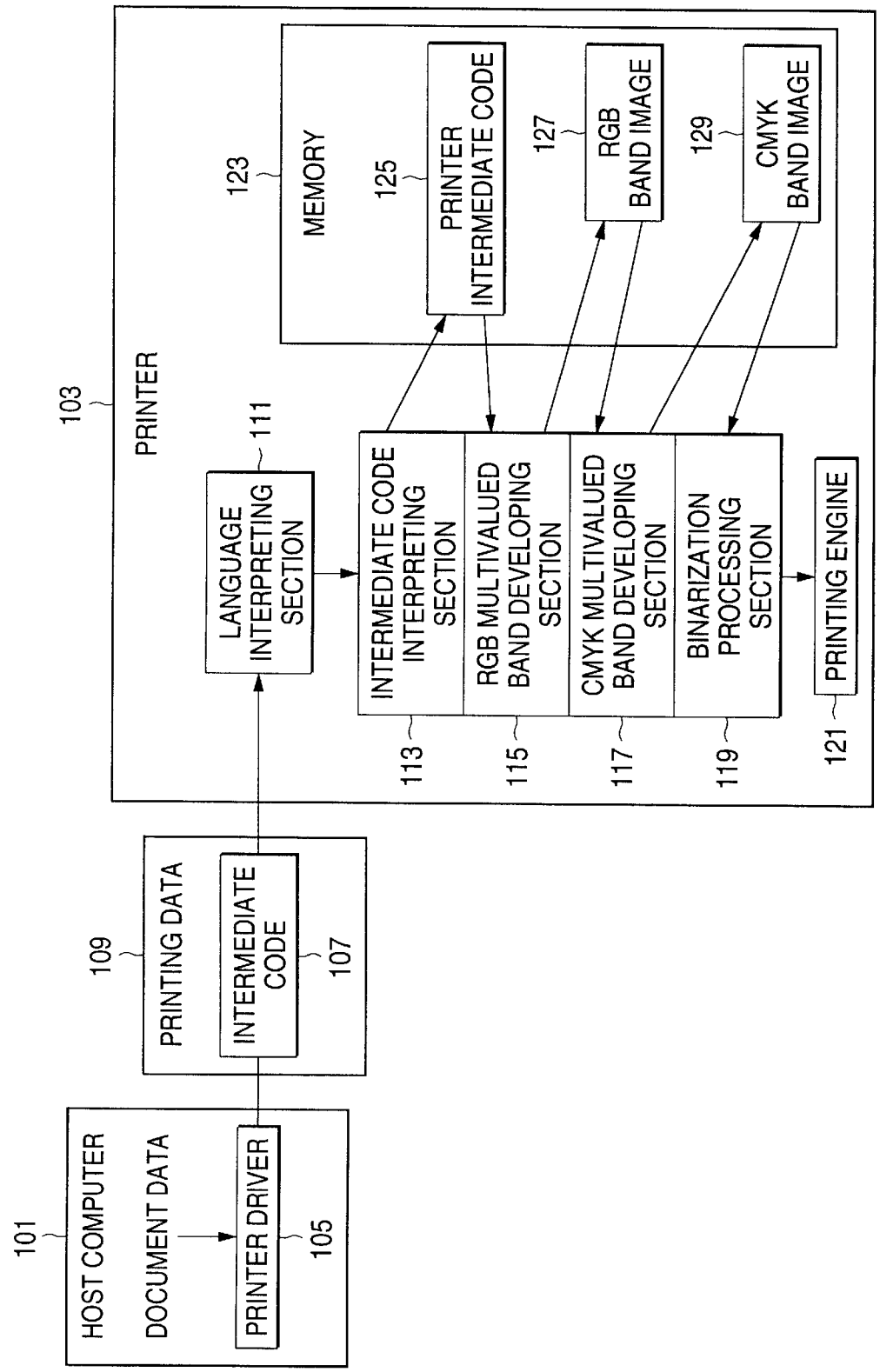
FIG. 11 is a block diagram showing a construction of a printing system of another embodiment of the present invention.

FIG. 11 is a view showing a printing system of another embodiment of the present invention.

The printer 103 is connected to a host computer 101. The host computer 101 has a printer driver 105. The printer driver 105 divides each page of data of a document to be printed into a plurality of bands, converts into an intermediate code 107 for each band, changes the intermediate code 107 into printing data 109 of a predetermined printer control language, and sends the data to a spool (not shown) in the host computer. Then, the printing data 109 is sent to the printer 103 by an operating system (not shown) of the host computer 101.

A microcomputer is incorporate into the printer 103. This microcomputer functions as a language interpreting section 111, intermediate code interpreting section 113, RGB multivalued band developing section 115, CMYK multivalued band developing section 117, and binarization processing section 119. The printer 103 has a printing engine 121. The language interpreting section 111 delivers an intermediate code 107 contained in the received printing data 109 to the intermediate code interpreting section 113. The intermediate code interpreting section 113 converts the intermediate code 107 into a printer intermediate code 125 suitable for processing in the printer 103, and registers it in a memory 123 of the microcomputer.

RGB multivalued band developing section 115 develops the printer intermediate code 125 into a multigradation raster image (RGB multivalued band image) 127 of RGB expression at each band and registers it in the memory 123. CMYK multivalued band developing section 115 converts RGB multivalued band image 127 of each band into a multigradation raster image 129 of CMYK expression and registers it in the memory 123. The binarization processing section 119 generates a binary signal, which expresses whether or not a CMYK ink dot is hit at each dot position, from CMYK multigradation raster image 129 and sends it to a printing engine 121. The printing engine 121 prints a document image on a sheet of paper in accordance with the binary signal.

In general, after the printing engine has been set in motion, it continues printing at a constant printing speed hereinafter. Therefore, the image development processing conducted by the band developing sections 115, 117 must not be delayed with respect to this speed. Accordingly, if the processing speed of the band developing sections 115, 117 is sufficiently high, the printing engine 121 may start printing at a point of time when image development of the first one band has been completed. However, in order to keep the printing operation to be safe, the printing engine 121 may start printing after image development of predetermined plural bands or image development of one page has been completed. In the latter case, in order to save the memory 123, it is preferable that the developed raster image is compressed and stored. Time to start printing, at which the printing engine 121 is started after the image development of bands has been completed, may be controlled in accordance with the type of a document to be printed, for example, whether color or monochrome, whether a natural image such as a photograph is contained or the image is composed of only a text and figure, whether or not the resolution is high, and whether or not the page size is large.

Figure 12:
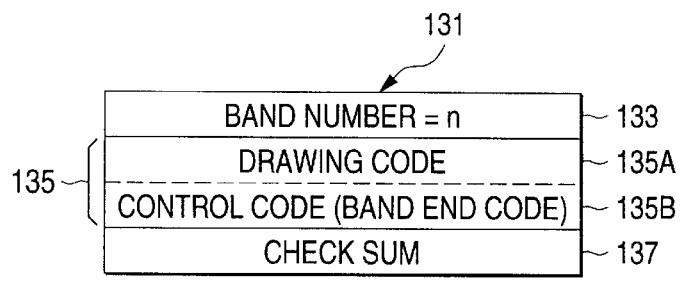
FIG. 12 is a block diagram showing a construction of an intermediate code block received by a printer.

The printer driver 105 in the host computer 101 operates as follows. When the document data is converted into an intermediate code 107, a content of each page of the document data is analyzed, and a region on each page is divided into a plurality of physical bands. Then, an intermediate code of each physical band is made and incorporated into an intermediate code block 131, the structure of which is shown in FIG. 12. In some cases, an intermediate code of one physical band is accommodated in one intermediate code block 131, however, in other cases, an intermediate code of one physical band is divided into a plurality of intermediate code blocks 131 and accommodated. Especially, in the case of color printing, in order to enhance the memory efficiency, a size of the intermediate code block 131 is made smaller than a normal data size of one band. Therefore, it is common that one physical band becomes a plurality of intermediate code blocks 131. The intermediate code 107 sent to the printer 103 is a row of a series of intermediate code blocks 131. The intermediate code blocks 131 are necessarily sent to the printer 103 in the order of numbers of the physical bands. No intermediate code blocks 131 are sent to the printer 103 out of the order of numbers of the physical bands. Further, the intermediate code blocks 131 in the same physical band are sent in the successive order. No intermediate code blocks 131 of different physical bands are inserted into the intermediate code blocks 131 of the same physical band.

As shown in FIG. 12, one intermediate code block 131 includes a number 133 of the physical band, a group of several intermediate codes 135, and a check sum. A content of the intermediate codes 135 can be classified into a drawing code 135A and a control code 135B. The printer driver 105 puts a code of band end, which is a control code, at the final intermediate code block 131 of each band. Therefore, the printer 103 can realize an end of each band by detecting the band control code.

Figure 13:
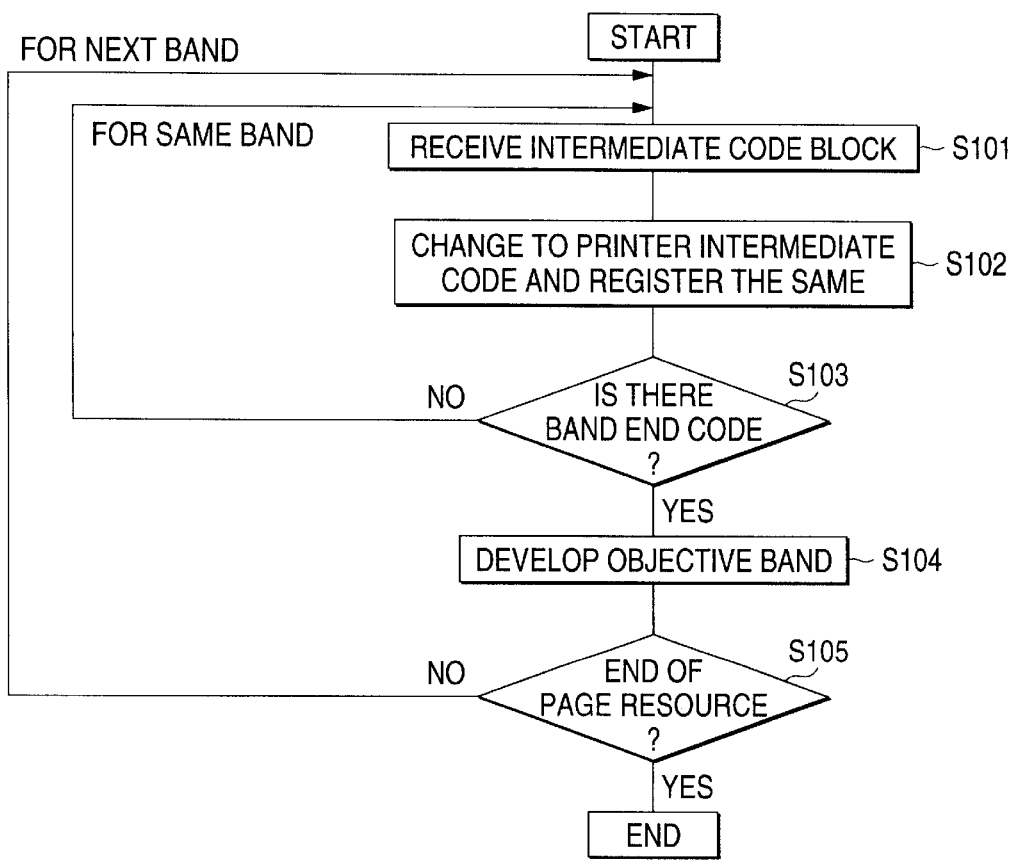
FIG. 13 is a flowchart showing processing of a printer.
Figure 14:
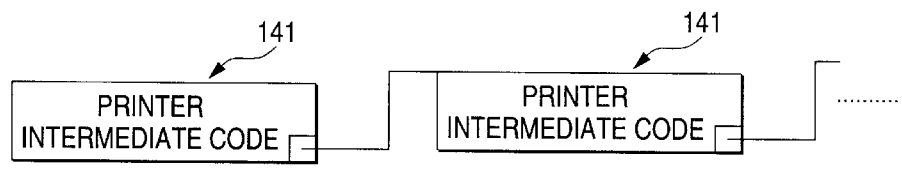
FIG. 14 is a block diagram showing a construction of an intermediate printer code registered in a printer.

FIG. 13 is a flowchart of processing conducted by the intermediate code analyzing section 113 and RGB multivalued band developing section 115 of the printer 103 which has received a row of the above intermediate code block 131.

When the intermediate code analyzing section 113 receives the intermediate code block 131 (step S101), the intermediate code 135 in the block 131 is converted into the printer intermediate code 125 and registered in the memory (step S102). At this time, the intermediate code analyzing section 113 changes the printer intermediate code into a type of the intermediate code block 141 of a predetermined size. This intermediate code block 141 is linked with the intermediate code block 141 of the same physical band number which has already been registered. In this way, this intermediate code block 141 is registered. The intermediate code analyzing section 113 checks whether or not the received intermediate code block 131 contains a band end code (step S103). Until the band end code is detected, the above intermediate code registering motion is repeated for the same band. Accordingly, the printer intermediate code 125 of one physical band is registered in the memory 123 in the form of a list of a plurality of intermediate code blocks 141 which are linked as shown in FIG. 104. Of course, the printer intermediate code 125 of one physical band is registered in the memory 123 in the form of a single intermediate code block 141.

When the band end code is detected, RGB multivalued band developing section 115 starts image development processing for the printer intermediate code of the same physical band registered in the memory 123 (step S104). Accordingly, waiting time from the start of receiving the printing data by the printer 103 to the start of image development is only a period of time in which the intermediate code of the first physical band is registered. Successively after the band development conducted by RGB multivalued band developing section 115, processing is respectively conducted by CMYK multivalued band developing section 119, binarization processing section 119 and printing engine 121.

While RGB multivalued band developing section 115 is conducting image development of the band which has already been registered, the intermediate code interpreting section 113 receives the intermediate code block 101 of the next band (step S101). This intermediate code block 141 is converted into the printer intermediate code and registered (step S102). In this way, the registration of the intermediate code of each band and the image development of the band which has registered before are conducted in parallel with each other. When the received page resource is completed, processing of the page concerned is completed, and the same processing is started for the next page.

The printer driver 105 incorporated into the host computer 101 will be explained in more detail as follows.

Figure 15:
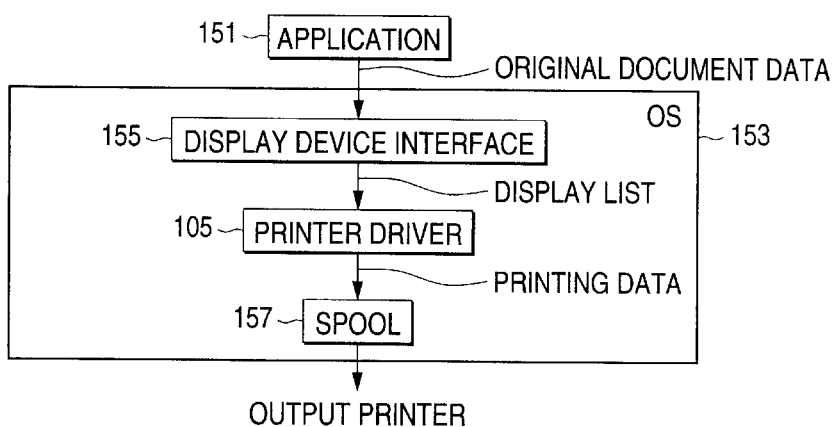
FIG. 15 is a block diagram showing a location of a printer driver in a host computer.

FIG. 15 is a view showing a location of the printer driver 105 in the host computer 101.

Original document data, which has been made by the application program 151, is first converted into a list of image drawing command, which is called a display list, by the display device interface 155 of the operating system 151. The printer driver 105 reads in this display list and converts it into printing data of a type of the intermediate code for each band described before. Then the data is written in a spool 157. The printing data in the spool 157 is transmitted to the printer 103 by the operating system 153.

Figure 16:
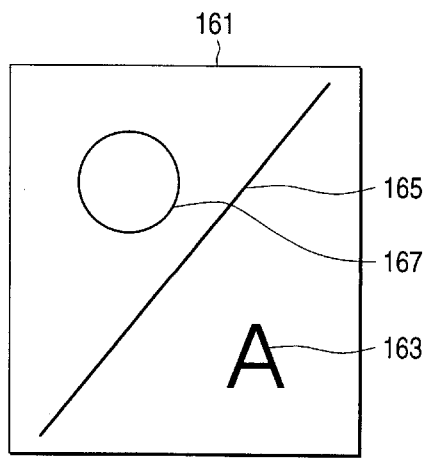
FIG. 16 is a view showing an example of a page.

In this connection, a case is supposed in which document data of one page containing elements 163, 165, 167 as shown in FIG. 16 is made by the application program 151. In this making process, first, a letter "A", the reference numeral of which is 163, is written, and then an oblique line 165 is drawn, and finally a circle 167 is drawn. In this case, the original document data and the display list are sent in the order of the letter 163, oblique line 165 and circle 167 which are the order when they are made.

Figure 17:
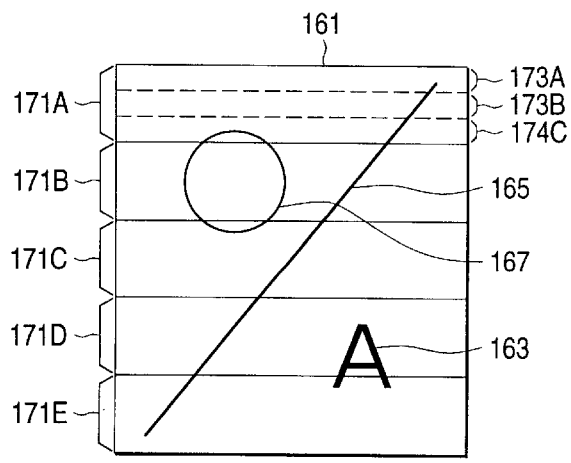
FIG. 17 is a view showing an example of division of a band.
Figure 18:
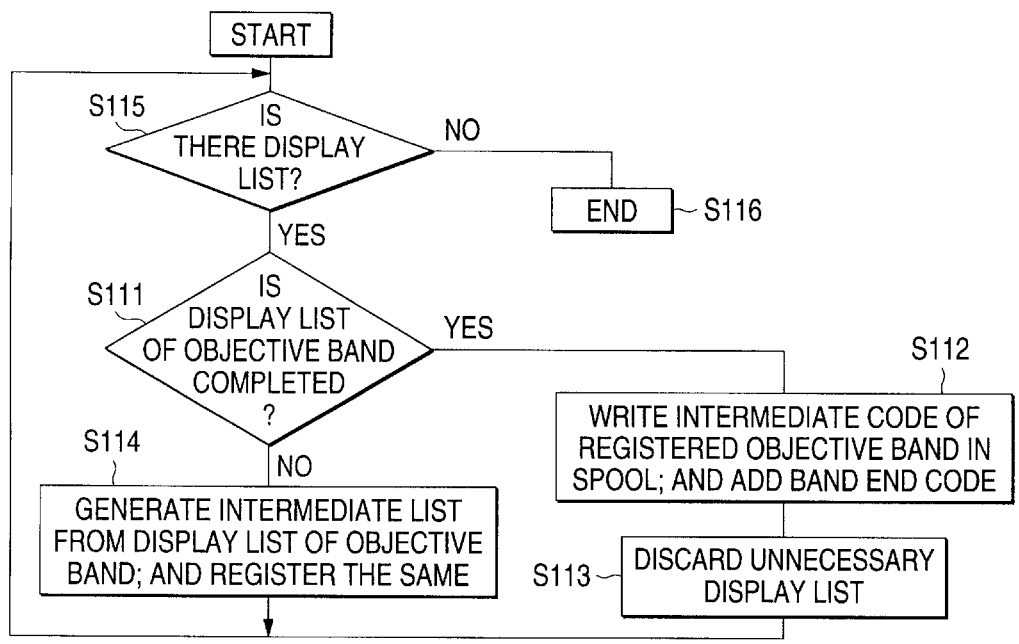
FIG. 18 is a flowchart showing a motion of a printer driver.

The printer driver 105 conducts processing as follows. First, as shown in FIG. 17, the printer driver 105 defines a plurality of bands 171A to 171E on the page 161 with respect to a display list of one page sent in the order of making the letter 163, oblique line 165 and circle 167. Then, the objective band is successively designated from the band 171A, which is located at an uppermost position, to the band located at a lower position, and then processing shown in the flowchart of FIG. 18 is conducted. In this connection, sizes of the bands 171A to 171E defined by the printer driver 105 are given by the integral multiples of the physical bands into which the page is divided by the firmware of the printer 103. Usually, the integral multiples are several times or at least one time.

As shown in FIG. 18, first, the printer driver 105 finds a drawing command of the element belonging to the objective band from the display list (step S111). According to it, the intermediate code of the objective band is made and registered in the memory in the host computer 101 (step S114).

The above operation is conducted for all drawing commands belonging to the objective band. For example, when the objective band is the second band 171B shown in FIG. 17, first, in accordance with the drawing command of the oblique line 165, an intermediate code of a portion of the oblique line 165 belonging to the objective band 171B is made according to the drawing command of the oblique line 165, and then an intermediate code of a portion of the circle 167 belonging to the objective band 171B is made according to the drawing command of the circle 167.

After intermediate codes of all elements belonging to one objective band have been registered (YES in step S101), the registered intermediate codes of the objective band are written in the spool 157 (step S112). At this time, a band end code is added to the last intermediate code. Next, the unnecessary display list is discarded (step S113). For example, if the registered intermediate code of the objective band has been written in the spool 157 with respect to the third band shown in FIG. 17, the drawing command of the circle 167 becomes unnecessary. Therefore, it is discarded.

When processing of one objective band is completed, the next band is designated as the objective band, and the above processing is repeated. The above processing is repeated for all on the display list (step S110). After the above processing has been repeated for all on the display list, processing of the printer driver 105 is completed (step S115).

Figure 19:
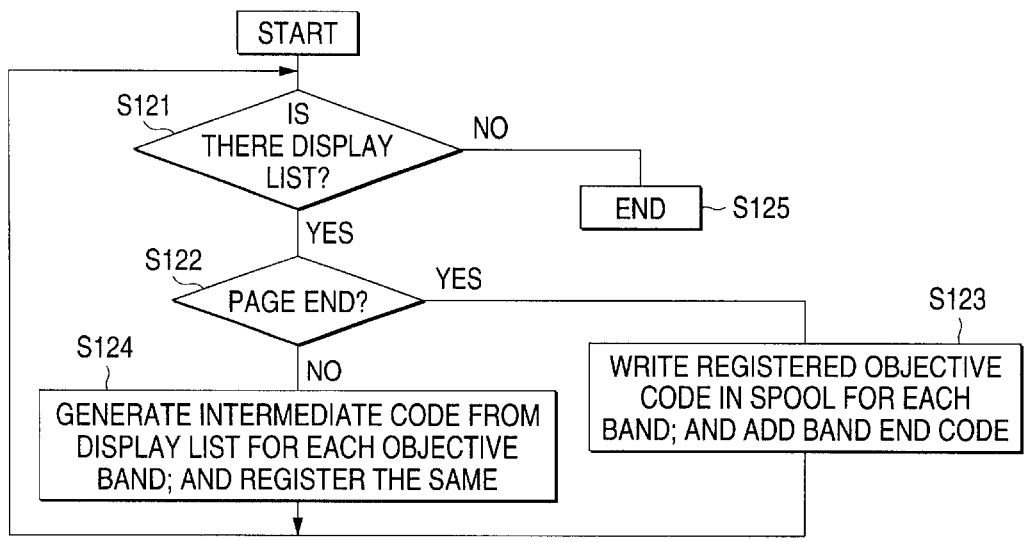
FIG. 19 is a flowchart showing another motion of a printer driver.

FIG. 19 is a flowchart of another processing which can be conducted by the printer driver 105. This processing can be conducted instead of the processing shown in FIG. 18.

By the same method as that explained in FIG. 18, the printer driver 105 makes and registers an intermediate code of the objective band (step S124). This motion is conducted on all bands while the bands 171A to 171E on the page are successively being designated as the objective bands. In this case, the order in which the objective bands are designated is not necessarily the same as the arrangement of the bands. Due to the foregoing, the intermediate codes of all bands on one page are registered. After that (YES in step S122), the registered intermediate codes of one page are written in the spool for each band. At this time, a bend end code is added to the last of the intermediate code of each band (step S123).

Processing described in FIG. 18 is advantageous in that the intermediate code can be generated by the memory of one band. On the other hand, the processing shown in FIG. 19 requires a memory of one page, however, the processing shown in FIG. 19 is advantageous in that the intermediate code can be made in the order of the bands which are different from the order of the arrangement of the bands on the page. In this connection, even in the processing shown in FIG. 18, if it is composed that the printer 103 accumulates the band image of one page and then the accumulated band image is sent to the printing engine 121, no problems are caused even when the printer driver 105 makes the intermediate codes in the order which is different from the arrangement of the bands and the thus made intermediate codes are sent to the printer 103.

The embodiment of the present invention is explained above, however, it should be noted that the present invention is not limited to the above specific embodiment, but it possible to apply the present invention in various forms. For example, the present invention can be applied to not only color printing but also monochrome printing. Band development processing conducted in the printer is not limited to the specific embodiment described above, but it is possible to provide various types of variations. The host computer and the printer 103 are connected to each other via net work.

The device to give printing data to the printer 103 is not necessarily the computer 101 having a function for generating printing data. The device to give printing data to the printer 103 may be a buffer device or printer server which relays printing data.

It should be noted here that the invention is not limited to the above-mentioned embodiment but other embodiments, which include changes, improvements, modifications and the like with respect to the above embodiment, are also possible.

What is claimed is:

1. A print system comprising a host computer and a printer connected to the host computer, wherein said host computer includes a printer driver used to generate print job data including plotting commands to be given to said printer, said printer driver includes intermediate level job data generation means used to generate intermediate level job data including plotting commands at least part of which is expressed in a first intermediate code format, and said printer includes intermediate code convert means used to receive said intermediate level print job data and convert said plotting commands to a second intermediate code format, and third convert means used to convert said second intermediate code to bit map image data for printing.

2. A print system as set forth in claim 1 wherein said intermediate level print job data includes specification information specifying which plotting commands are expressed in said first intermediate code format, and said intermediate code convert means distinguishes said plotting commands in said first intermediate code format from others in accordance with said specification information.

3. A print system as set forth in claim 1, wherein said printer driver further includes high-level job data generation means used to generate high-level print job data including plotting commands all of which are expressed in a high-level printer control language, and mode select means used to select one of said intermediate level job data generation means and said high-level job data generation means, and also wherein said printer further includes graphics means used to receive said high-level print job data and convert said plotting commands expressed in said high-level printer control language to said second intermediate code.

4. A print system as set forth in claim 3, wherein said mode select means automatically selects one of said intermediate level job data generation means and said high-level job data generation means, on a basis of per print job, per page, per band, per plotting command, or per application program.

5. A print system as set forth in claim 3, wherein said mode select means always selects said high-level job data generation means when a print job uses fonts provided internally in said printer.

6. A print system as set forth in claim 1, wherein said first intermediate code format includes bit map image data on characters or images to be plotted, whereas said second intermediate code format does not include bit map image data on characters or images to be plotted.

7. A print system as set forth in claim 1, wherein said intermediate level job data generation means includes pre-develop means used to pre-develop bit map image data from said plotting commands expressed in said first intermediate code format.

8. A printing method using a host computer and a printer connected to the host computer, said method comprising the following steps:

generating, in said host computer, intermediate level print job data including plotting commands which are to be given to said printer and at least part of which is expressed in a first intermediate code format, and then transmitting said generated print job data to said printer;

receiving, in said printer, said intermediate level print job data and converting said plotting commands to a second intermediate code; and converting, in said printer, said second intermediate code to bit map image data for printing.

9. A printer driver for generating print job data including plotting commands to be given to a printer, said printer driver comprising:

intermediate level job data generation means for generating intermediate level job data including plotting commands, at least part of which is expressed in a first intermediate code format;

high-level job data generation means for generating high-level job data including plotting commands, all of which are expressed in a high-level printer control language; and mode select means for selecting one of said intermediate level job data generation means and said high-level job data generation means.

10. A program medium carrying a printer driver computer program for generating print job data including plotting commands to be given to printer, characterized in that said program medium carries a group of instructions for generating intermediate level job data including plotting commands at least a part of which is expressed in a first intermediate code format, in such a manner that said group of instructions can be read and understood by a computer; a group of instructions for generating high-level job data including plotting commands, all of which are expressed in a high-level printer control language; and a group of instructions for selecting one of said intermediate level job data generation means and said high-level job data-generation means.

11. A printer, comprising:

means for receiving print job data including plotting commands;

intermediate code convert means for, when said plotting commands of said received print job data are expressed in first intermediate code format, converting said first intermediate code to a second intermediate code; and third means for converting said second intermediate code to bit map image data for printing.

12. A printer as set forth in claim 11, further including graphics means for, when said plotting commands of said received print job data are expressed in a high-level printer control language, converting said plotting commands in said high-level printer control language to said second intermediate code.

13. A printer comprising:

band end detecting means for detecting an end of each band to be developed as an image by receiving a driver intermediate code, which is generated by a printer driver;

image developing means for developing an image of each band in accordance with the driver intermediate code, which has already been received, in response to the detection of the end of each band; and a printing engine for conducting printing in accordance with the developed image.

14. The printer according to claim 13, wherein the image developing means accumulates images of bands of one page and then the accumulated images are provided to the printing engine.

15. The printer according to claim 13, wherein a device external to the printer contains the printer driver.

16. A printer comprising:

band end detecting means for detecting an end of each band to be developed as an image by receiving a driver intermediate code, which is generated by a printer driver;

image developing means for developing an image of each band in accordance with the driver intermediate code, which has already been received, in response to the detection of the end of each band;

a printing engine for conducting printing in accordance with the developed image; and means for converting the driver intermediate code of each band into a printer intermediate code appropriate to be processed in the printer, and for registering the printer intermediate code in a memory of the printer, wherein the image developing means develops an image of each band, which has already been registered in the memory, in response to the detection of the end of each band;

wherein part of the driver intermediate code is substantially the same as that of the printer intermediate code.

17. A printer driver which divides each page of a document to be printed into a plurality of bands, generates an intermediate code of each hand and adds information expressing an end of each band to the generated intermediate code.

18. The printer driver according to claim 17, wherein information of a number of each band is added to the generated intermediate code.

19. The printer driver according to claim 17, wherein an intermediate code of each band is generated in the form of at least one intermediate code block, and information expressing an end of each band is added to the last intermediate code block of the band.

20. The printer driver according to claim 19, wherein a band number of each band is added to each intermediate code block of each band.

21. The printer driver according to claim 17, wherein a size of the band is given by integral multiples of a size of the band by which the printer divides one page.

22. The printer driver according to claim 17, wherein an intermediate code of each generated band is output to the printer each time when an intermediate code of the band is generated.

23. The printer driver according to claim 17, wherein an intermediate code of each generated band is output to the printer after intermediate codes of all bands of one page have been generated.

24. A printing system comprising a printer driver and a printer, wherein the printer driver divides each page of a document to be printed into a plurality of bands, generates an intermediate code of each band and adds information expressing an end of each band to the generated intermediate code, and the printer comprises: band end detecting means for detecting an end of each band by an intermediate code supplied from the printer driver image developing means for developing an image of each band in accordance with the intermediate code, which has already been received, in response to the detection of the information; and a printing engine for conducting printing in accordance with the developed image.

25. A printing system comprising a host computer and a printer connected to the host computer, wherein the host computer is provided with a printer driver, the printer driver divides each page of a document to be printed into a plurality of bands, generates an intermediate code of each band and adds information expressing an end of each band to the generated intermediate code, and the printer comprises: band end detecting means for detecting an end of each band by an intermediate code supplied from the printer driver; image developing means for developing an image of each band in accordance with the intermediate code, which has already been received, in response to the detection of the information; and a printing engine for conducting printing in accordance with the developed image.

26. A recording medium capable of being read by a computer, holding a computer program so that the computer can function as a band end detecting means for detecting an end of each band to be developed as an image by receiving an intermediate code, which is generated by a printer driver, and can function as an image developing means for developing an image of each band in accordance with the intermediate code, which has already been received, in response to the detection of the end of each band.

27. A recording medium capable of being read by a computer, holding a computer program so that the computer can function as a printer driver which divides each page of a document to be printed into a plurality of bands, generates an intermediate code of each band and adds information expressing an end of each band to the generated intermediate code.

28. A recording medium capable of being read by a computer, holding an intermediate code generated by a printer driver of each band dividing each page of a document to be printed, to which information expressing an end of each band to be developed as an image is added.

29. A printer comprising:

a band end detector that detects an end of each band to be developed as an image by receiving a driver intermediate code, which is generated by a printer driver;

an image developer that develops an image of each band in accordance with the driver intermediate code, which has already been received, in response to the detection of the end of each band; and a printing engine for conducting printing in accordance with the developed image.

* * * * *

UNITED STATES PATENT AND TRADEMARK OFFICE
CERTIFICATE OF CORRECTION

PATENT NO. : 6,665,081 B1
DATED : December 16, 2003
INVENTOR(S) : Tetsuya Suzuki et al.

It is certified that error appears in the above-identified patent and that said Letters Patent is hereby corrected as shown below:

<u>Title page,</u>
Item [54], Title, should read:
-- PRINT SYSTEM, PRINTER DRIVER AND PRINTER --

Signed and Sealed this

Sixth Day of July, 2004

JON W. DUDAS
*Acting Director of the United States Patent and Trademark Office*